(12) United States Patent
Daisy

(10) Patent No.: US 8,774,562 B2
(45) Date of Patent: Jul. 8, 2014

(54) SYSTEMS, METHODS, AND MEDIA FOR CREATING MULTIPLE LAYERS FROM AN IMAGE

(71) Applicant: Kyran Daisy, Commack, NY (US)

(72) Inventor: Kyran Daisy, Commack, NY (US)

( * ) Notice: Subject to any disclaimer, the term of this patent is extended or adjusted under 35 U.S.C. 154(b) by 0 days.

(21) Appl. No.: 13/902,173

(22) Filed: May 24, 2013

(65) Prior Publication Data
US 2013/0329990 A1    Dec. 12, 2013

Related U.S. Application Data

(63) Continuation of application No. 13/233,216, filed on Sep. 15, 2011, now Pat. No. 8,467,601.

(60) Provisional application No. 61/383,022, filed on Sep. 15, 2010.

(51) Int. Cl.
*G06K 9/03* (2006.01)

(52) U.S. Cl.
USPC .......................... 382/309; 382/299; 382/302

(58) Field of Classification Search
USPC ......... 382/162, 165, 103, 145, 118, 149, 141, 382/199, 254, 202, 283, 309, 299, 302; 345/629, 641, 440, 418, 419, 2.1, 474, 345/427, 647, 660, 619, 665; 348/125; 399/40, 408, 231; 707/999; 1/1; 703/23; 713/182; 715/201, 256; 705/14.61, 14.4
See application file for complete search history.

(56) References Cited

U.S. PATENT DOCUMENTS

| | | | | |
|---|---|---|---|---|
| 5,649,171 A * | 7/1997 | Craven et al. | .................... | 703/23 |
| 6,466,210 B1 * | 10/2002 | Carlsen et al. | ................ | 345/629 |
| 7,388,978 B2 * | 6/2008 | Duvdevani et al. | ........... | 382/145 |
| 7,761,713 B2 * | 7/2010 | Baar | ............................. | 713/182 |
| 7,831,178 B2 * | 11/2010 | Priebe et al. | .................. | 399/231 |
| 7,965,961 B2 * | 6/2011 | Priebe et al. | .................. | 399/231 |
| 8,139,089 B2 * | 3/2012 | Doyle et al. | .................. | 345/647 |
| 8,350,872 B2 * | 1/2013 | Shoemaker et al. | .......... | 345/665 |
| 8,467,601 B2 * | 6/2013 | Daisy | ............................ | 382/165 |
| 8,655,112 B2 * | 2/2014 | Bansal et al. | ................. | 382/309 |

* cited by examiner

*Primary Examiner* — Anh Do
(74) *Attorney, Agent, or Firm* — Wilmer Cutler Pickering Hale and Dorr LLP

(57) ABSTRACT

A method for creating a plurality of layer images from an input image is provided. The method includes analyzing an input image for color content to detect at least one dominant color in the image and for shape recognition to detect at least one object in the image. The method also includes generating a concentric grid for the input image based on the color content analysis and the shape recognition for a depth calculation of the input image. The concentric grid includes a center point, a plurality of lines that radiate from the center point, and a plurality of concentric circles that expand at a spatial distance in the input image. The concentric circles divide the input image into a plurality of sections, each of which represents an equal spatial depth. The method further includes generating a plurality of layer images using at least two of the plurality of sections.

22 Claims, 11 Drawing Sheets

SYSTEMS, METHODS, AND MEDIA FOR CREATING MULTIPLE LAYERS FROM AN IMAGE

CROSS-REFERENCE TO RELATED APPLICATIONS

This application is a continuation of U.S. patent application Ser. No. 13/233,216, filed on Sep. 15, 2011, which claims the benefit under 35 U.S.C. §119(e) of U.S. Provisional Patent Application No. 61/383,022, filed on Sep. 15, 2010, each of which is hereby incorporated by reference herein in its entirety.

BACKGROUND

Existing photo editing application programs lack features that enable users to generate and manage layers from a photographic image. Presently, the users have to manually create individual layers. In order to print the layers individually, the users must either save the layers in separate files or hide individual layers saved in a file to isolate the one intended for printing, and print each layer separately. If it is desired to edit the image, the user must either manually generate individual layers from the photographic image, in which some elements of the image may become unable to edit (e.g., text would become an image object), or create the layers from scratch, hoping that the changes made to the individual layers will roughly correspond to the editing made to the original photographic image.

Furthermore, while the existing photo editing application programs enable the users to create manually an individual layer by selecting, cutting, and then pasting one or more objects in the photographic image, in printing they often fill the rest of the individual layer with a single default background color (e.g., white background, etc.), resulting in loss of translucence and nuance.

SUMMARY

Systems, methods, and media for creating multiple layers from an image are provided. The disclosed subject matter enables automatic generation of multiple layer images from an input image based in part on depth calculations for the input image.

In one embodiment, a method for creating a plurality of layer images from an input image is provided. The method includes analyzing an input image for color content to detect at least one dominant color in the input image and for shape recognition to detect at least one object in the input image. The method also includes generating a concentric grid for the input image based on the color content analysis and the shape recognition for a depth calculation of the input image. The concentric grid includes a center point, a plurality of lines that radiate from the center point, and a plurality of concentric circles that expand at a spatial distance in the input image, and the concentric circles divide the input image into a plurality of sections, each of which represents an equal spatial depth. The method further includes generating a plurality of layer images using at least two of the plurality of sections. An order of the plurality of layer images in the method may be determined by a direction of perceived depth based on the depth calculation.

The method may further include analyzing the input image to determine at least one of a horizontal horizon line and a vertical horizon line in the input image based on at least one of the color content analysis and the shape recognition, wherein the horizontal horizon line and the vertical horizon line are used to determine the center point of the concentric grid.

The method may further include calculating a degree of shadow on each of the at least one object in the input image detected through the shape recognition by analyzing pixel data of each of the detected at least one object and comparing a percentage of color change of each detected object to its neighboring objects.

The method may further include determining a light source direction and a light source angle of the input image by comparing and analyzing shadow color gradient of the at least one object detected through the shape recognition.

The depth calculation in the method may include using ratios of spatial dimensions of an outermost section of the plurality of sections to spatial dimensions of inner sections of the plurality of sections that are closer to the center point.

The shape recognition in the method may be performed using a shape library that includes a series of geometric shapes and patterns, a series of combinations of shapes, and a series of letters and text. The color content analysis in the method may be performed using a color library that includes a spectrum of colors, a color saturation scale, and a color intensity scale.

Analyzing the input image for the shape recognition to detect the at least one object in the input image in the method may include correlating a detected shape to at least one already recognized object within the input image to determine if the detected shape matches near objects. The input image of the method may include a monochromatic image and wherein, if the at least one dominant color in the monochromatic image is detected throughout more than a predetermined percentage of the monochromatic image, analyzing the monochromatic image for shape recognition includes desaturating the monochromatic image to detect shapes based on shape outlines and resaturating the monochromatic image.

In another embodiment, a system for creating a plurality of layer images from an input image is provided. The system includes a memory capable of storing data and a processor. The processor is coupled to the memory and configured to use the data such that the system can analyze an input image for color content to detect at least one dominant color in the input image and for shape recognition to detect at least one object in the input image. The processor can also generate a concentric grid for the input image based on the color content analysis and the shape recognition for a depth calculation of the input image. The concentric grid includes a center point, a plurality of lines that radiate from the center point, and a plurality of concentric circles that expand at a spatial distance in the input image, and the concentric circles divide the input image into a plurality of sections, each of which represents an equal spatial depth. The processor can further generate a plurality of layer images using at least two of the plurality of sections.

In another embodiment, a non-transitory computer readable storage medium storing computer executable instructions is disclosed. The computer executable instructions, when executed on a processor, can cause the processor to perform a method for creating a plurality of layer images from an input image. The method includes analyzing an input image for color content to detect at least one dominant color in the input image and for shape recognition to detect at least one object in the input image. The method also includes analyzing the input image to determine a horizontal horizon line and a vertical horizon line in the input image based on the color content analysis and the shape recognition, wherein the horizontal horizon line and the vertical horizon line are used to determine a furthest point in the input image. The method also includes generating a concentric grid for the input image using the furthest point for a depth calculation of the input image. The concentric grid includes a center point, a plurality of lines that radiate from the center point, and a plurality of concentric circles that expand at a spatial distance in the input image, and the concentric circles divide the input image into a plurality of sections, each of which represents an equal spatial depth, wherein the center point is determined based on the furthest point and wherein the depth calculation includes using ratios of spatial dimensions of an outermost section of the plurality of sections to spatial dimensions of inner sections of the plurality of sections that are closer to the center point. The method further includes generating a plurality of layer images using at least two of the plurality of sections, wherein an order of the plurality of layer images is determined by a direction of perceived depth based on the depth calculation.

DETAILED DESCRIPTION

Systems, methods, and media for creating multiple layers from an image are provided. In some embodiments of the disclosed subject matter, systems, methods, and media are provided for automatically creating multiple layers from an input image, e.g., to print the multiple layers on media, such as transparencies, and present the printed layers with the perception of depth, e.g., by housing the printed layers in shadowboxes and/or frames.

Figure 1:
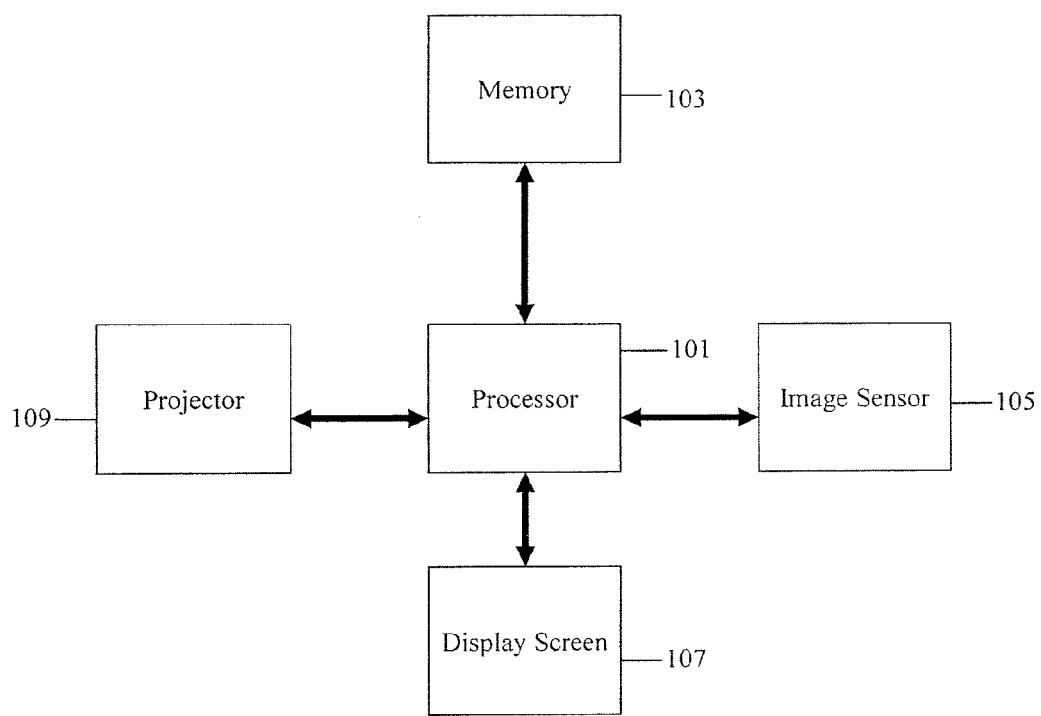
FIG. 1 is a block diagram illustrating a system that can be used for creating a plurality of layer images from an input image in accordance with some embodiments of the disclosed subject matter.

FIG. 1 is a block diagram illustrating a system 100 that can be used for creating a plurality of layer images from an input image in accordance with some embodiments of the disclosed subject matter. Referring to FIG. 1, system 100 includes a processor 101, a memory 103, an image sensor 105, and a display screen 107. In some embodiments, system 100 also includes a built-in projector 109 for projecting screen views displayed on display screen 107.

Processor 101 may be a general-purpose processor, a special purpose processor, or an embedded processor of any architectures known in the art, including reduced instruction set computer (RISC) or complex instruction set computer (CISC) processor architecture. Memory 103 may be of any types of memory known in the art, including read only memory (ROM), such as programmable read only memory (PROM), erasable PROM (EPROM), electrically erasable PROM (EEPROM), and flash memory (e.g., NAND flash, NOR flash), and random access memory (RAM), such as static RAM (SRAM) and dynamic RAM (DRAM). Image sensor 105 may be a charge-coupled device (CCD) based image sensor or a complementary metal oxide semiconductor (CMOS) sensor. Display screen 107 may be a cathode ray tube (CRT) display, a liquid crystal display (LCD), or a plasma display.

System 100 may be implemented in one of various electronic or computing devices, such as a hand-held device, a digital camera, a desktop, a laptop, a workstation, an enterprise server, and other general- and special-purpose electronic and computing devices. In some embodiments, system 100 is implemented using a touch screen tablet. The touch screen tablet may be configured to serve as a full-service professional photography station with functionalities, such as photo editing and printing capabilities. In some embodiments, a photo layering application is installed and run on system 100 to create multiple layers from an input image.

Figure 2:
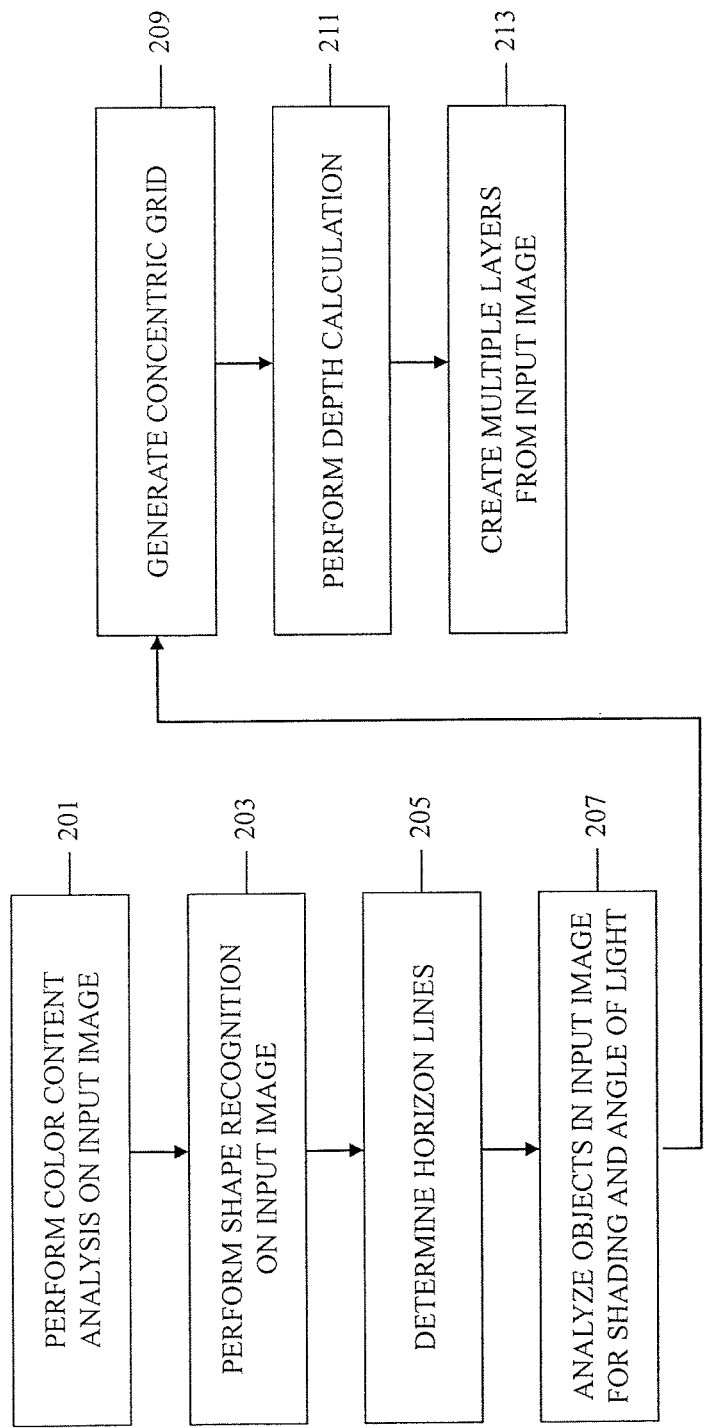
FIG. 2 is an illustrative diagram of a process for creating a plurality of layer images from an input image in accordance with some embodiments of the disclosed subject matter.
Figure 3:
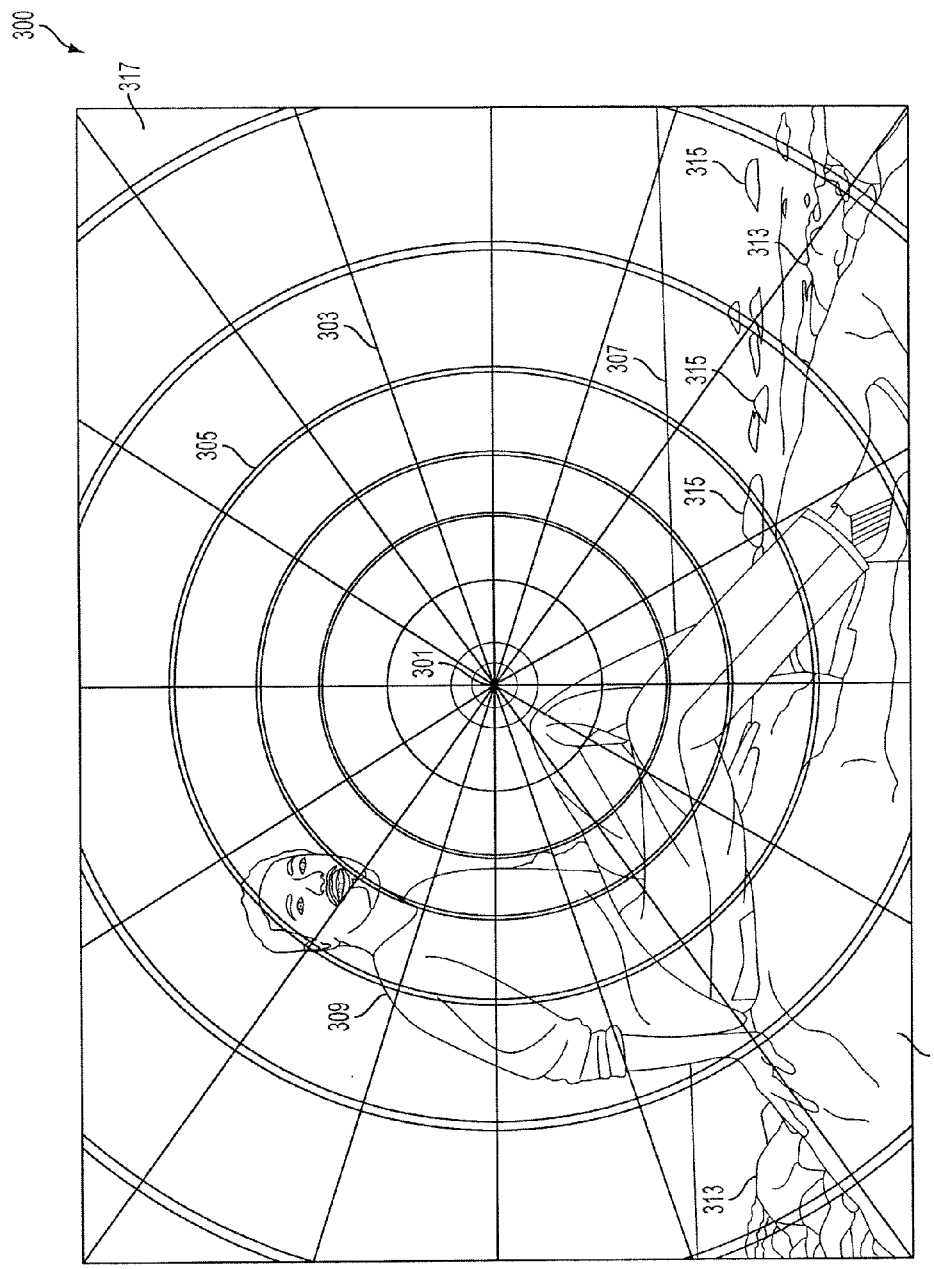
FIG. 3 is an illustrative image showing a concentric grid generated for depth calculations in accordance with some embodiments of the disclosed subject matter.

FIG. 2 is an illustrative diagram of a process 200 for creating a plurality of layer images from an input image in accordance with some embodiments of the disclosed subject matter. FIG. 3 is an illustrative image 300 showing a concentric grid generated for depth calculations. FIGS. 2 and 3 will be referenced together in providing the details of process 200.

Referring to FIG. 2, at 201 a color content analysis is performed on an input image. In some embodiments, a color content analysis is performed to detect one or more dominant colors in the input image. For example, dominant colors may be used as indicators to determine the farthest point in the input image. For instance, a background of an input image, such as the sky in image 300, may be used to determine the farthest point. In some embodiments, number and/or placement of pixels (e.g., 325 or more pixels having a same color, 64 adjacent pixels having a same color) are used for determining one or more dominant colors.

At 203, a shape recognition analysis is performed on the input image. In some embodiments, pixels are examined individually and clustered based on patterns that match the shapes stored in a shape library for shape recognition, color grouping, and combinations of shapes. The input image may be broken down into a series of geometric shapes and patterns based on combinations of shapes to determine objects within the image. For example, shape recognition and determination of color groupings and continuous lines may be used to determine objects within the image.

Starting from a center point of an image and radiating outward, each pixel may be analyzed for detecting indicators, such as shapes, color, scale, and the like. For example, continuous edges, such as lines and curves of continuous color, and clusters of color (e.g., pure hue and gradations) may be determined by examining adjacent pixels. Scale, proximity, and shape recognition may be used to group objects (e.g., a rectangular object that changes midway from one color to another, etc.).

In some embodiments, in which a monochromatic image is used as an input image and where a dominant color is detected throughout more than a certain percentage of the image (e.g., 60%), the input image is first de-saturated to detect shapes and separate the detected shapes based on shape outlines. The de-saturated image may then be returned to its original color saturation (i.e., re-saturated) upon completion.

In some embodiments, in which an image in translucence or transparency is used as an input image, continuous edges detected in the image are used for object determination. For example, the outermost continuous edges may be used to determine an object's parameters and may envelop, or group, all overlapping objects that fall completely within those parameters. Such objects are referred to as dependent objects. Objects outside of this parameter, however, may be considered occluded and treated as independent objects. Changes in color and patterns in shape a determined by pixel comparisons and settings for the pixel comparisons can be turned on and off by the user.

At 205, one or more horizon lines are determined. In some embodiments, the horizon lines are determined based on the color content analysis and/or the shape recognition analysis. Indicators, such as color (e.g., a line of consecutive and adjacent pixels of 'x' color and 'y' number of pixels wide), may be used as cues to determine a horizontal horizon line, such as horizon 307 in image 300. A horizontal horizon line may be placed at the bottom border of the input image if no horizontal horizon line is detected within the image using color content analysis and/or shape recognition analysis. The user may also designate one or more horizontal horizon line.

A vertical horizon line may be determined based on where the light source occurs by assessing the angle of the light source. The angle of the light source may be assessed by comparing color gradation of the objects detected within the input image. The color gradations of the compared objects may be integrated into the perspective of the input image to determine the direction in which depth occurs. A vertical horizon line may be placed at the left or right border of the input image, if no vertical horizon line is detected within the frame of the input image.

The plane of an input image may include a horizontal horizon line that divides a vertical horizon line. In some embodiments, the cross point of the horizontal horizon line and the vertical horizon line is used as the farthest point for the image, such as point 301 in image 300.

At 207, the objects detected in the input image are analyzed for shading and angle of light. In some embodiments, the degree of shadow on an object is calculated by analyzing the pixel data of all detected objects within an input image and comparing the percentage of color changes to that of neighboring objects. The degree of shadow of the objects in an image may be used for depth calculation. For example, if object 2 is found to be 60% in shadow of object 1 and object 3 is found to be 25% in shadow of object 1, then object 2 may be determined to be located deeper in the image than object 3.

In some embodiments, light source direction and angle can be determined using the shadow color gradient of the detected objects. Indicators, such as color and color saturation (i.e., intensity of hues), may be used to examine neighboring shapes to correlate them to the already determined objects within the input image, based on the premise that the purest and most intense colors occur in the light, with the lightest and purest hues being closer, while shaded (or darker) variations of that hue occur in shadow and are farther away.

In some embodiments, black color is used as the default determinant for shadow. The degree in which the color of an object strays from its purest hue toward black may be used as an indication of depth and how far the object extends into shadow. Black objects, being of a pure hue without variation, may be determined with color content and/or shape recognition analysis.

Shadows may be detected by measuring shadow length and intensity, with those that are lighter and longer being farther away and those that are shorter and darker being closer, and comparing shapes, based on neighboring patterns, to see if the shadows match objects near them. Shadows tend to be close to the objects that cast them.

There may be a corresponding shape to determine a correlating shadow that falls on an object. A degree of distortion may be factored in to associate objects with shadows based on the angles of the gradation of hue from light to dark. The amount of the change in color in a shadow may be also used as an indicator to help determine depth as well as the distance the shadow falls from an object.

In some embodiments, a shadow's distance from the object that created it is used as an indicator of depth, and is assessed based on the direction in which the shadow falls in relation to the angle of the color gradient. The angle of the color gradient in turn may be determined for determining the angle of the light source.

At 209, a concentric grid, as shown in FIG. 3, is generated for depth calculations. Utilizing the premise that the camera angle is pointed in the direction of the farthest point, such as point 301 in image 300, a conical web-like grid radiating from a single point (i.e., the farthest point) may divide the input image into sections that represent equal length and depth. The conical grid includes lines 303 that radiate from the center 301 of the cone and circles 305 that expand at equal distances, thereby dividing the image. The default setting for the farthest point may be the center of the input image. The user may also move and define the farthest point.

At 211, depth calculations are performed. Depth may be calculated based on the conical grid. For example, depth may be calculated using a ratio comparing the dimensions of outermost regions to the dimensions of those closer to the center point 301. In some embodiments, the ratios of the center point 301 of the conical grid to the placement points of the detected objects in the grid are used as indicators to determine scale and depth.

At 213, a plurality of layer images is created from the single input image. In some embodiments, the determination of which elements (e.g., objects, etc.) are to be separated into which layer is made based on scale and by comparing the size of the detected objects. For example, smaller objects may be placed in background layers and larger objects that are not occluded by other objects may be placed in foreground layers. Objects that are occluded by other objects within the image may be placed in the background layers and the occluding objects may be placed forward of the occluding objects. Layers may be created for each comparative size until there are no more layers to create.

In some embodiments, in which text objects are present in the image, shape recognition and the angle of the lettering are used to differentiate text objects and separate the text objects into layers. A direction of depth determined based on the perspective of the image may be used to order the layers.

In some embodiments, in which the input image includes a shadow that is not connected to the object that casts the shadow by adjacent pixels, the shadow is placed in a separate layer from the object based on scale and proximity to neighboring objects. In some embodiments, in which text objects are present in the image, an order of the layers are determined using indicators related to the text objects, such as text scale, color, occlusion, and the like.

Various effects may be provided to edit the input image to make the image look more realistic. For example, shadow distance effect may be used to create depth within a picture image when inserting new shadows. Such effects may be strewn across multiple layers. For instance, a distance setting for depth within the picture image (e.g., 2 ft., 10 ft., etc.) may be selected and a line of intersection may be designated to indicate where a shadow should bend and at what angle, as the shadow falls across another object. The shape of the inserted shadow may be tailored to the designated angles. The effects may be broken up and rendered/printed on multiple layers determined by the depth calculation.

For an illustrative example, multiple layers may be created based on image 300 as following. For instance, the outermost layer of image 300 may include person 309 on a rock 311. The next layer may include smaller rocks 313 adjacent to rock 311. The next layer may include small rocks 315 that are further in the distance. The next layer may include the water ending with horizon 307. The next, innermost background layer may include the background sky 317, which dominates over 50% of the image space with a dominant color.

The resulting layers then may be printed and assembled in a shadowbox or frame. The layers may also be printed on transparency papers. The layers may be separated by a glass pane, and the like. and a backlight may be used to shine light through the layers.

Figure 4B:
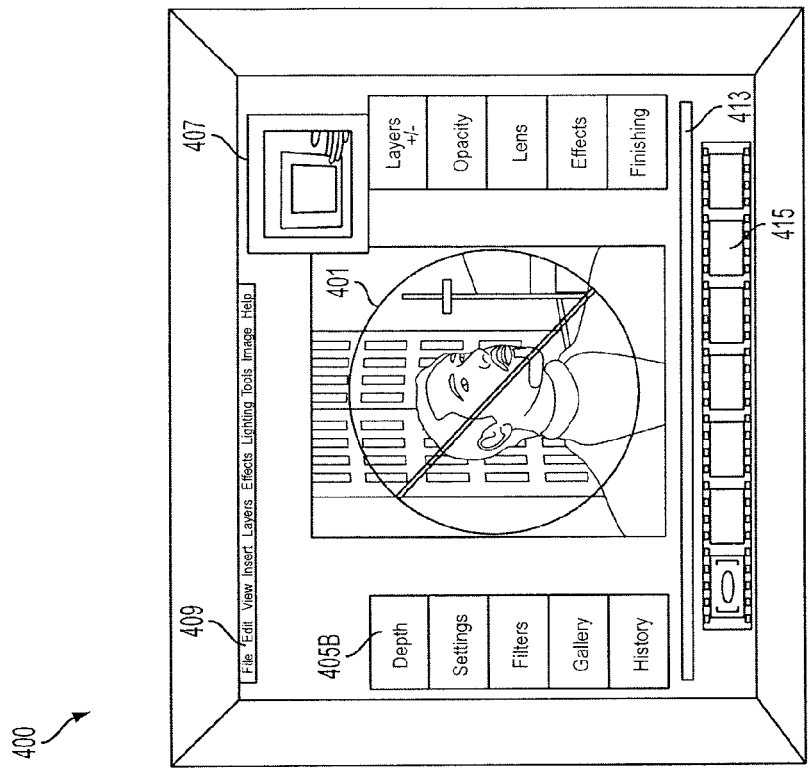
FIGS. 4A-B are illustrative images showing a photo editing interface for editing a selected image in accordance with some embodiments of the disclosed subject matter.
Figure 4A:
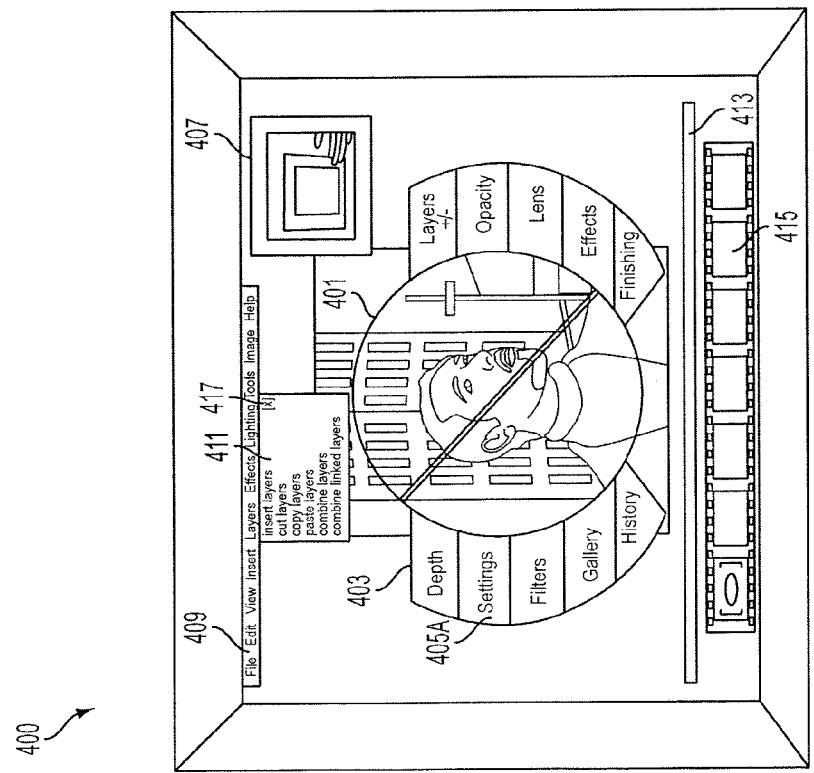

FIGS. 4A-B are illustrative images showing a photo editing interface 400 for editing a selected image in accordance with some embodiments of the disclosed subject matter. Referring to FIG. 4A, photo editing interface 400 includes a shutter 401, a jog wheel 403, jog wheel menu tabs 405A, a history window 407, a menu bar 409, a pull down menu 411, and a bar 413 that separates interface 400 from film strip menu 415. In some embodiments, interface 400 is a touch screen interface.

Shutter 401 is the central image of photo editing interface 400 that resembles a camera shutter for displaying an input image for editing. Jog wheel 403 provides the user with a means for selecting menu tabs 405A. History window 407 shows the original image prior to edits and/or steps selected in the edit history.

Jog wheel 403 is a feature of interface 400 that is made to create easy access to the function of the pull down menu 411. For example, the user may create a palette of favorite functions and settings to reuse with ease as they are working through interface 400. In some embodiments, jog wheel 403 can be customized by adding or removing menu tabs 405A, and menu tabs 405A may be added to jog wheel 403 option by, for instance, touching the 'x' 417 at the top of each section of pull down menu 411.

Menus may be grouped into families of functions and touching each menu tab 405A opens a list of submenus to reveal the functions. When in the shape of a wheel, as shown in FIG. 4A, jog wheel 403 may be touched at a point to allow the user to control it like a dial to execute and control the degree of a selected editing function, such as history, undo, rotation, perspective, scale, distortion, saturation, opacity, cropping, previewing effects, and the like. In some embodiments, as shown in FIG. 4B, menu tabs 405B are not in the jog wheel formation.

Table 1 provides illustrative menu options. These options are merely illustrative, and any other menu options or combination of options may be provided.

TABLE 1

| File | Edit | View | Image |
|---|---|---|---|
| Open photo | Undo - with keep or discard options to delete steps out of sequence | Gallery | Image size |
| Open video | | Shoot | Canvas size |
| Save | | Single Image | Rotate canvas |
| Save as | | Print Size | Adjust |
| Import: camera, USB source | History | Full screen | Saturation |
| Export: as image or video file | Cut | Zoom | Hue |
| Page setup | Copy | Split Screen | Contrast |
| Print | Paste | Comparison: by last edit or original, vertical or horizontal display | Flatten image |
| Contact sheet: batch by parameter (shoot or series # - history: stages of an image as modified from open to end save with settings and effects to achieve that look. Can revert to each stage if contact sheet is selected) or single image | Select | | |
| | Inverse | | |
| | Crop | | |
| | Depth calculation | Layered image | |
| | Transform | | |
| | Rotate | | |
| Preferences: can setup a palette of frequently used functions and settings (appears in lower right corner) | Spatial 3-D rotation | | |
| | Scale | | |
| | Distort | | |
| Quit | Perspective | | |

| Insert | Layers | Effects | Lighting Tools |
|---|---|---|---|
| Image | B&W | Filters | *Light meter tool |
| Object | Color replacement | Blur | *Lighting map for professionals 3D view |
| Layer | Desaturate: layer or global | Sharpen | of the shoot and object placement and |
| Effect | | Lens flare | scale; can view in multiple angles to see a |
| | Effects | Artistic | mock view of how light would fall and |
| | Shadow | Lens effects: | under what conditions - underwater, closed |
| | Light | fisheye, telescopic, | set, natural light - sunrise, noon, dusk, |
| | Emboss | panoramic | sunset, overcast, night shoots, - can plan |
| | Pillow emboss | Finishing | for contingencies |
| | Bevel | | Spotlight or directional light |
| | Opacity | | Gels w/color wheel selection |

TABLE 1-continued

| | |
|---|---|
| Text: vertical, horizontal, curved to dimensions - square, triangle, sphere, circle, rectangle - input specs to size exactly by font and measurement with tracking and leading<br>Merge: linked, visible, selected, flatten image<br>Discard image and save selected layers as a new file: layered or flattened | 3 point or multi-source<br>Diffusion<br>Contrast<br>Soft box<br>Hard light<br>Sunlight<br>*Wattage intensity can be chosen by user in specifications |

Figure 5B:
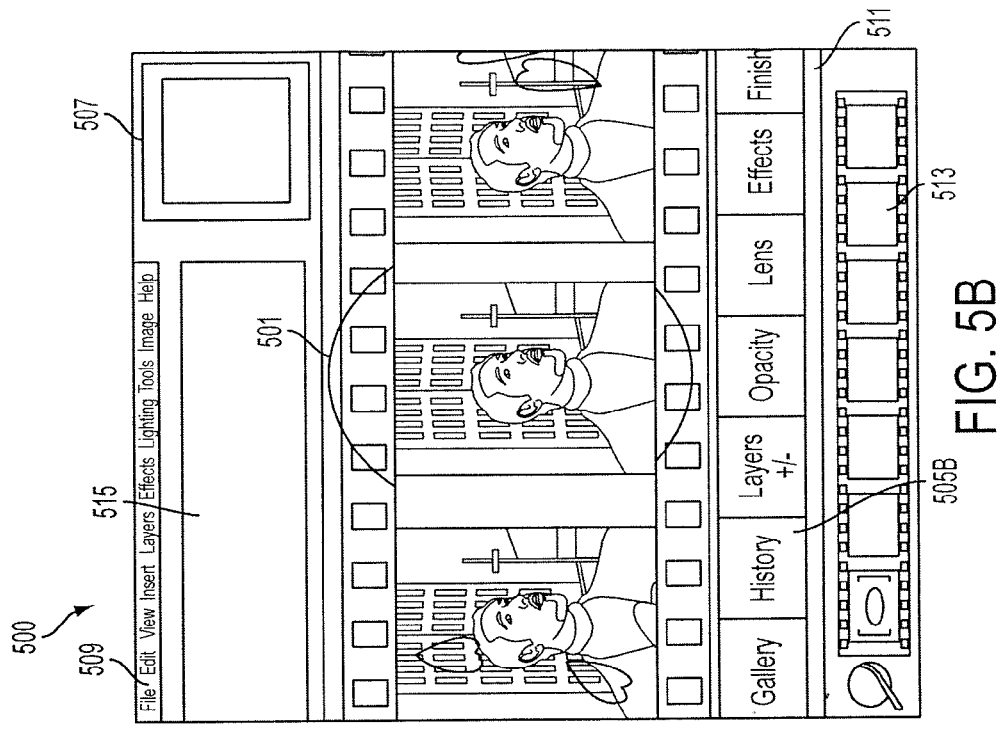
FIGS. 5A-B are illustrative images showing a video editing interface for editing a video frame in accordance with some embodiments of the disclosed subject matter.
Figure 5A:
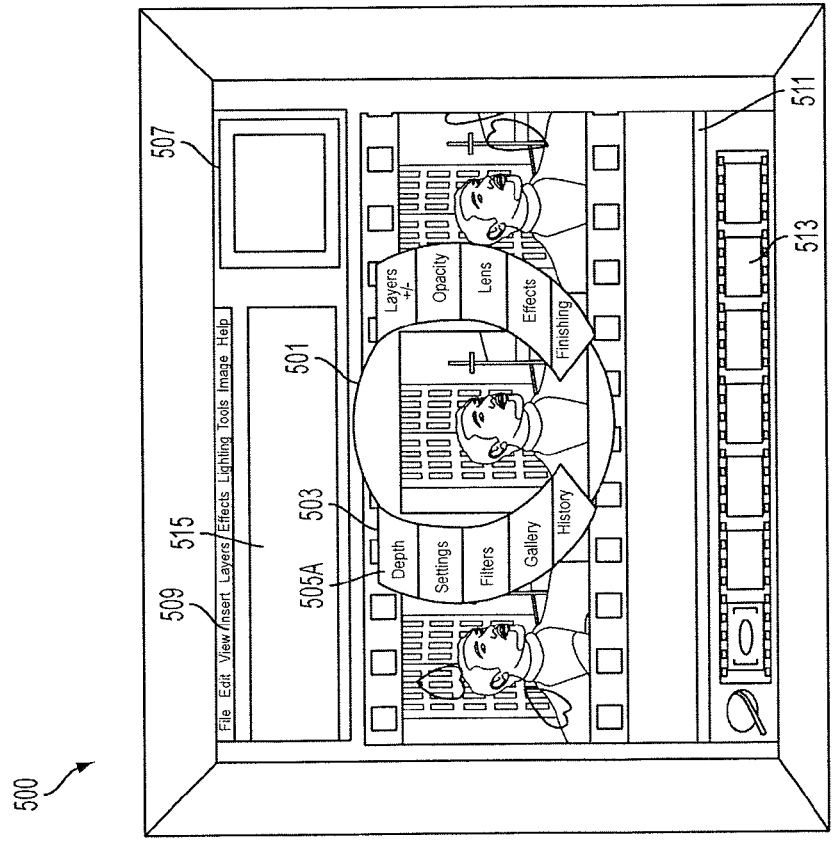

FIGS. 5A-B are illustrative images showing a video editing interface 500 for editing a video frame in accordance with some embodiments of the disclosed subject matter. Referring to FIG. 5A, video editing interface 500 includes a shutter 501, a jog wheel 503, jog wheel menu tabs 505A, a history window 507, a menu bar 509, a bar 511 that separates interface 500 from film strip menu 513, and a playback window 515. In some embodiments, interface 500 is a touch screen interface. In some embodiments, as shown in FIG. 5B, menu tabs 505B are not in the jog wheel formation. As shown in FIGS. 5A-B, video editing interface 500 includes the same editing functions and features of photo editing interface 400.

Under video editing mode, however, the effects of editing may be applicable to individual video frames. The effects of editing can be also applicable to segments of a film or to the entirety of the film. For example, segments of a video or a film may be batch-edited by applying the same edits to each of the segments.

Playback window 515 is used to play back the edited version of a video/film. In some embodiments, history window 507, which plays back the original, unedited version of the video/film, and playback window 515 can play the edited and unedited versions of the video/film simultaneously. In some embodiments, bar 511 serves to synchronize audio to one or more video frames.

Figure 6:
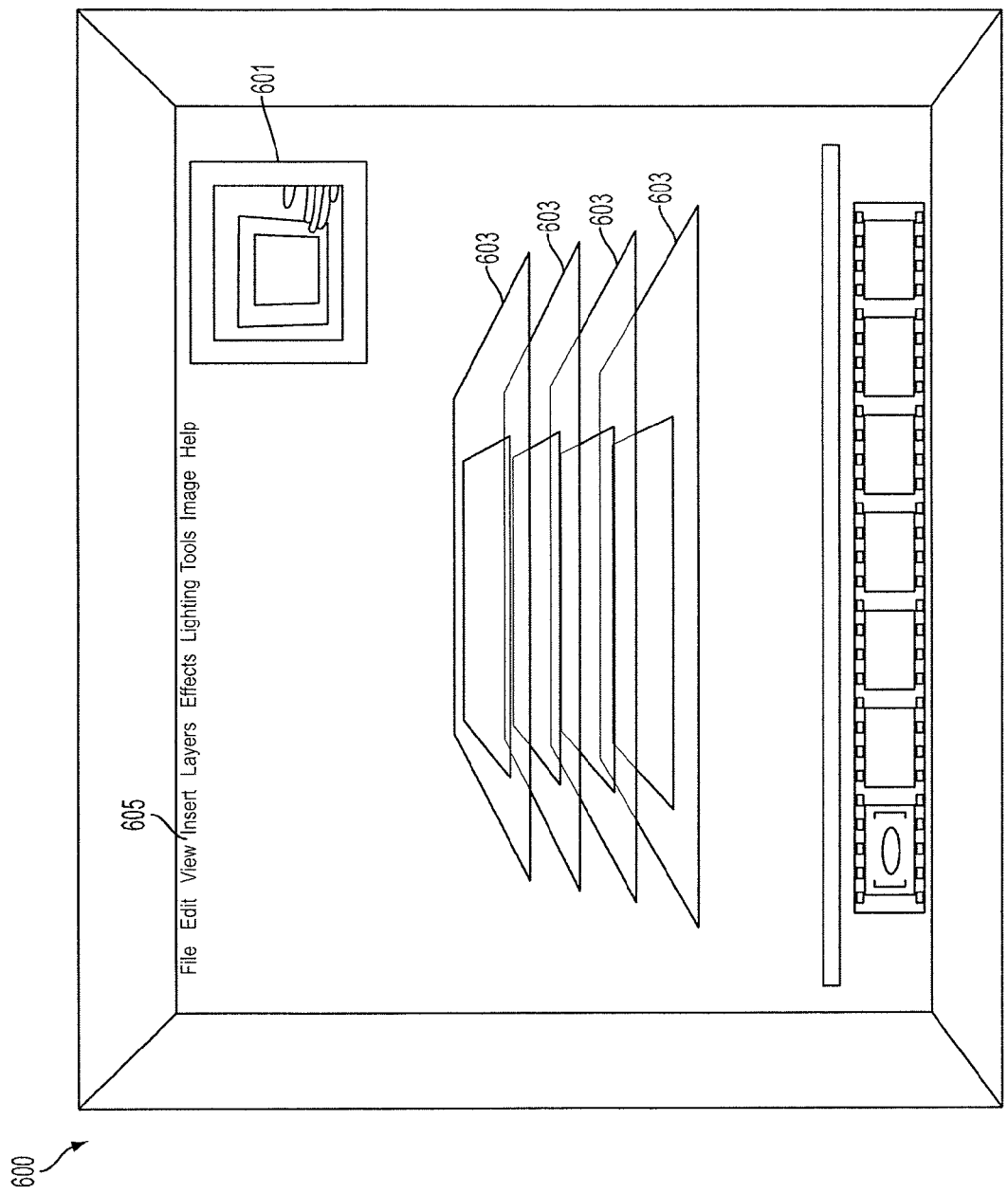
FIG. 6 is an illustrative diagram showing a selection interface for selecting one or more of multiple layer images in accordance with some embodiments of the disclosed subject matter.

FIG. 6 is an illustrative diagram showing a selection interface 600 for selecting one or more of multiple layer images in accordance with some embodiments of the disclosed subject matter. Referring to FIG. 6, selection interface 600 includes a history window 601, multiple layers 603 of an input photo/image or a video frame (shown inside history window 601), and a menu bar 605.

In some embodiments, by displaying a side view with all layers relevant to, e.g., the input photo/image, selection interface 600 allows the user to select a layer to work on. For example, the user can move, merge, remove, group and manipulate the layers with a variety of editing functions. Selection interface 600 may also display a scroll view of each of the layers at the bottom of the interface. The scroll view may be displayed together with a gallery view of multiple photos/images.

Figure 7B:
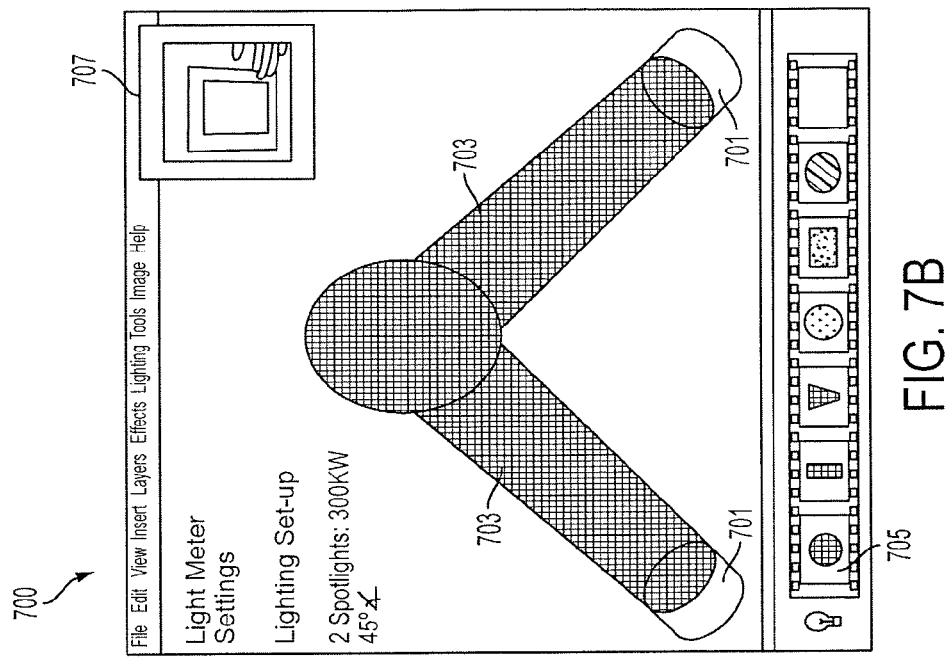
FIGS. 7A-B are illustrative diagrams showing a lighting map interface for placing lighting effects on an image in accordance with some embodiments of the disclosed subject matter.
Figure 7A:
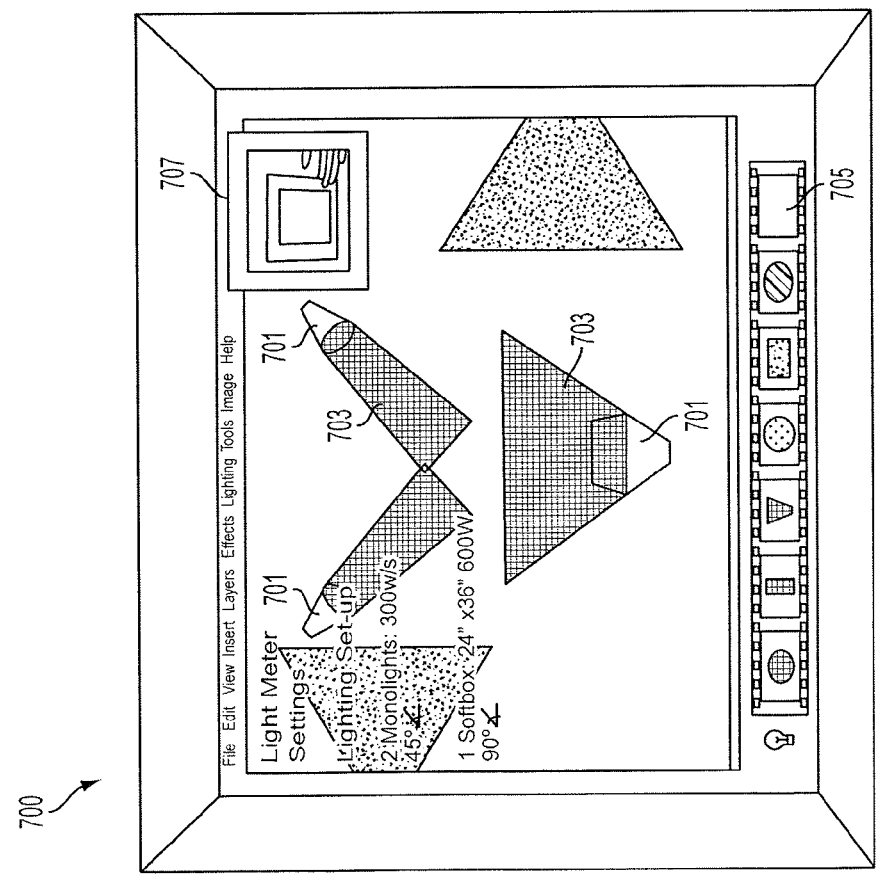

FIGS. 7A-B are illustrative diagrams showing a lighting map interface 700 for placing lighting effects on an image in accordance with some embodiments of the disclosed subject matter. Referring to FIGS. 7A-B, lighting map interface 700 includes lights 701 emitting light 703 of different color and intensity, a lighting menu 705, and a preview window 707.

Lighting map interface 700 allows the user to determine and simulate, based on manual input (e.g., through lighting menu 705) or light meter reading, the conditions of light surrounding an object. The user can place one or more lights 701 in varying angles and locations and control characteristics (e.g., color, intensity, etc.) of emitted light 703 from each light 701. Preview window 707 can display a preview of how an object in the input photo/image/video frame may look under each light condition determined by the user.

Figure 8:
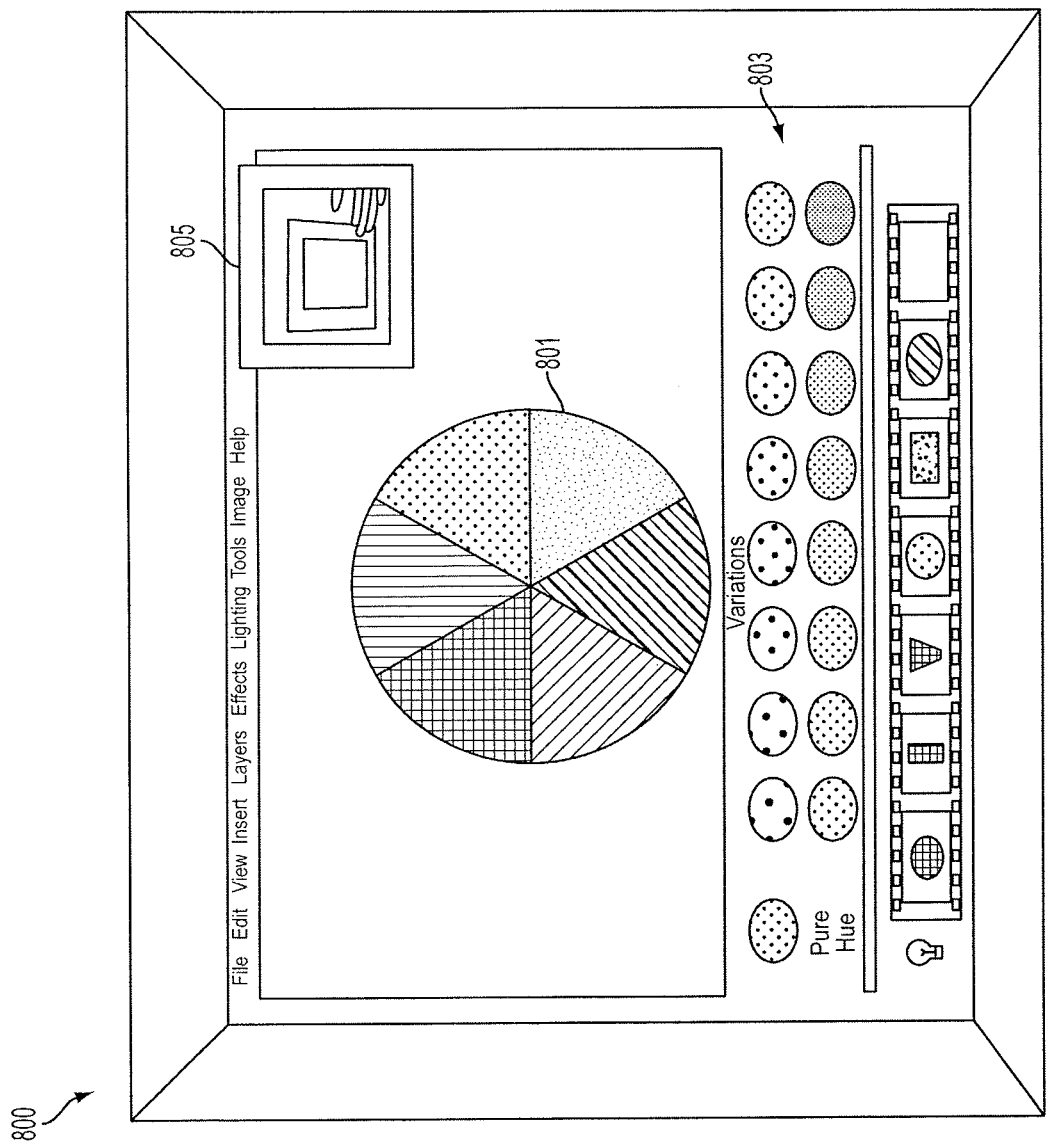
FIG. 8 is an illustrative diagram showing a color gel selection interface for selecting color gels and other filters in accordance with some embodiments of the disclosed subject matter.

FIG. 8 is an illustrative diagram showing a color gel selection interface 800 for selecting color gels and other filters in accordance with some embodiments of the disclosed subject matter. Referring to FIG. 8, color selection interface 800 includes a color wheel 801, a hue palette 803, and a preview window 805.

Gel color selection interface 800 allows the user to select color gels and other filter elements to edit an input photo/image/video frame or one or more layers thereof. The user may select a color of a color gel using color wheel 801. Once a color for the color gel is selected, hue palette 803 displays the pure hue and a plurality of variations of the pure hue for the selected color. Preview window 805 displays a preview of how the input photo/image/video frame, or one or more layers thereof, may look when the selected color and hue of the color gel is used to cast the color on the photo/image/video frame, or layers thereof. The selected color gels may cast color as a projection from a lighting source and this feature can also be used in the lighting map interface.

Figure 9:
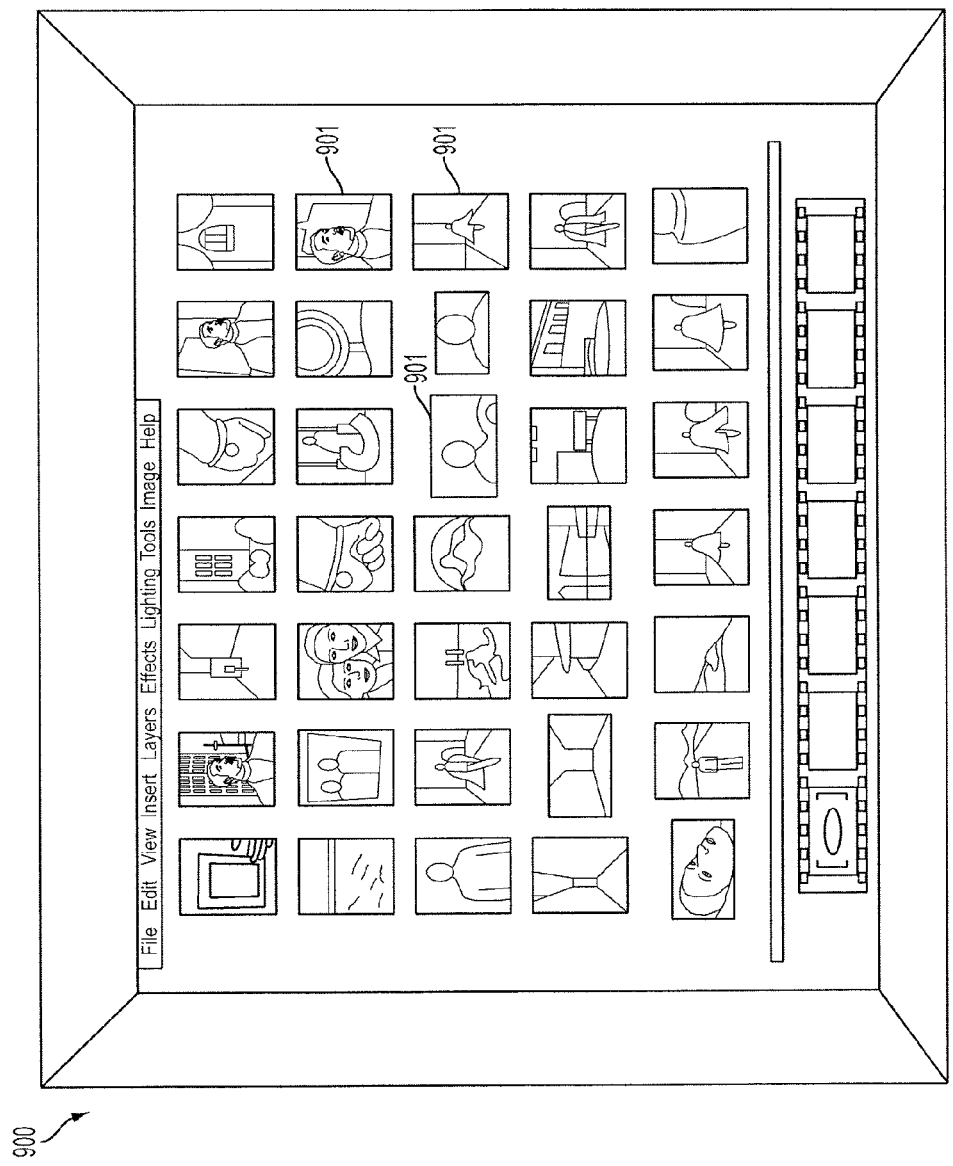
FIG. 9 is an illustrative image showing a gallery view interface for selecting input images in accordance with some embodiments of the disclosed subject matter.

FIG. 9 is an illustrative image showing a gallery view interface 900 for selecting input images in accordance with some embodiments of the disclosed subject matter. Referring to FIG. 9, gallery view interface 900 displays a plurality of images 901. In some embodiments, the photos, images, or video frames represented by thumbnail images 901 in gallery view interface 900 are stored in a library of image/video portfolios. Gallery view interface 900 may be made as the default view.

In some embodiments, thumbnail images 901 are arranged by name. Thumbnail images 901 can be rearranged by user preferences, such as photo-shoot date, subjects of images, theme, color, and the like. Editing tools may be accessed from gallery view interface 900. In some embodiments, a translucent editing interface can open over gallery view interface 900. Gallery view interface 900 can be switched to a portfolio mode in which a slideshow of gallery images can be presented.

Figure 10B:
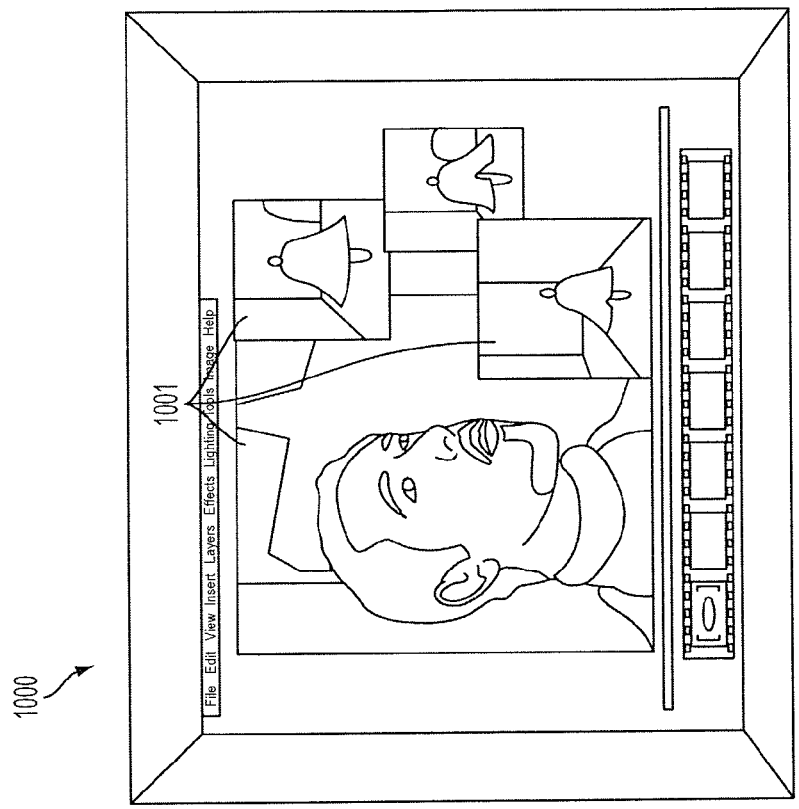
FIGS. 10A-B are illustrative images showing the gallery view interface acting as a contact sheet for image enlargement and comparison in accordance with some embodiments of the disclosed subject matter.
Figure 10A:
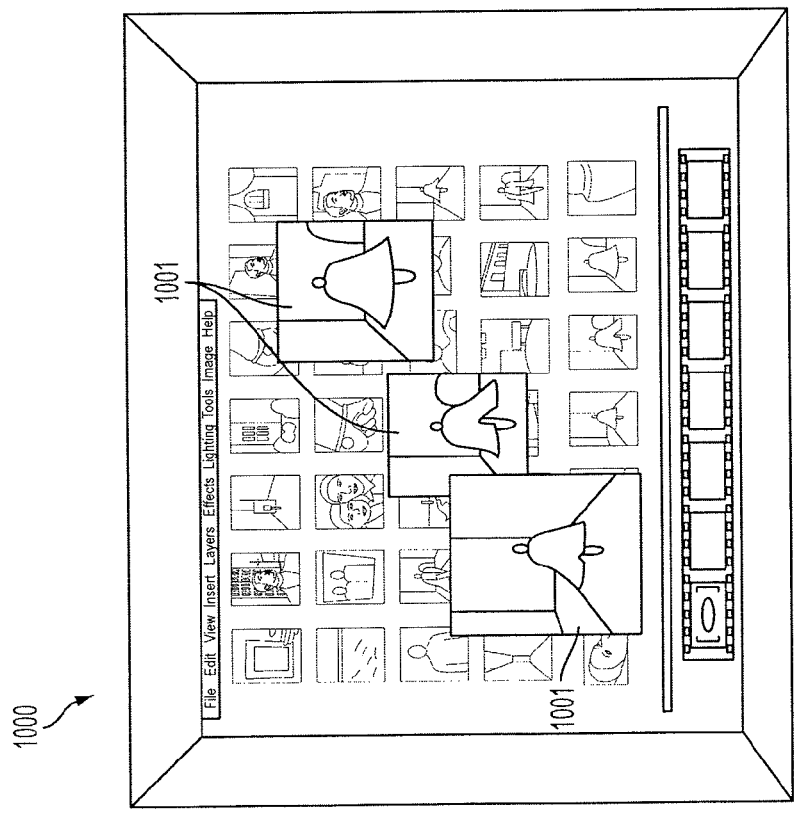

FIGS. 10A-B are illustrative images showing the gallery view interface acting as a contact sheet 1000 for image enlargement and comparison in accordance with some embodiments of the disclosed subject matter. Referring to FIG. 10, contact sheet 1000 displays one or more enlarged images 1001 over thumbnail images, such as thumbnail images 901, e.g., to compare multiple images side-by-side.

In some embodiments, touching, or single tapping, a thumbnail image enlarges the image. Double tapping enlarged images 1001 may shrink the images back to thumbnail images. If an enlarged image has been edited, the edited version of the image may be saved separately while the original image remains intact. In some embodiments, a magnification bubble appears where a tapping/touching is detected and provides a magnified preview of the image without enlarging the image tapped by the user. The user can move the magnification bubble to inspect various parts on the image, thereby removing the need for a magnifying loupe.

Figure 11B:
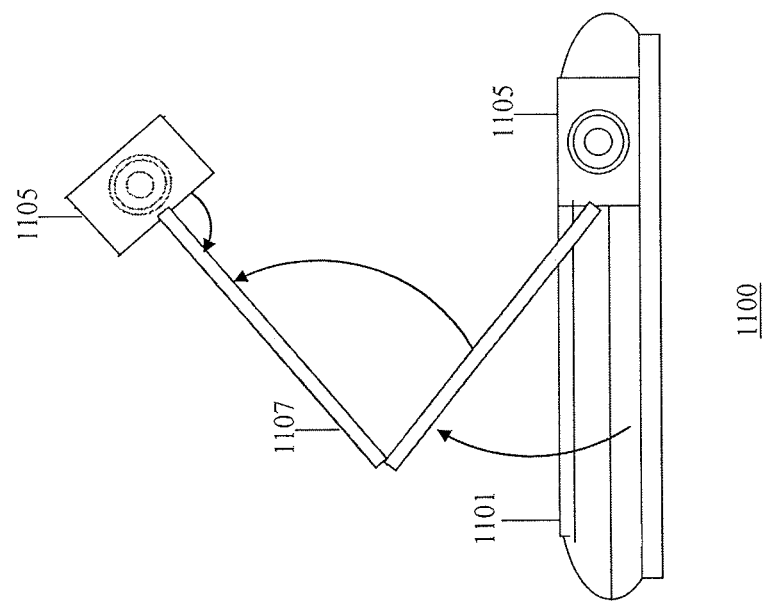
FIGS. 11A-B are illustrative diagrams of a device embodying a system for creating multiple layer images from an input image in accordance with some embodiments of the disclosed subject matter.
Figure 11A:
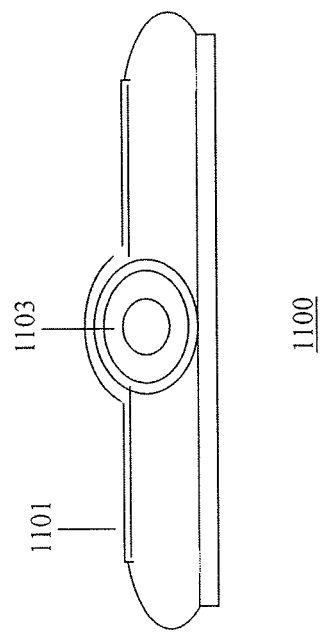

FIGS. 11A-B are illustrative diagrams of a device 1100 embodying a system for creating multiple layer images from an input image in accordance with some embodiments of the disclosed subject matter. FIG. 11A shows one side of device 1100 where a built-in projector 1103 is located. Projector 1103 allows visual presentations of the user's work. Projector 1103 also allows the user (e.g., photographer) to edit, e.g., photos/images, with a larger screen size and to map out placements for lighting. Device 1100 also include a display screen 1101 for displaying images/photos/video frames as well as various user interfaces.

FIG. 11B shows the opposite side of device 1100 where a camera 1105 with a movable neck 1107 is located. Camera 1105 can be used to take pictures/images and save directly to device 1100. In some embodiments, camera 1105 is detachable and upgradeable. In some embodiments, the head of camera 1105 can swivel to allow for picture taking in any direction.

In some embodiments, an image layering application is installed and run on device 1100. The image layering application allows the user to combine several images side-by-side to create panoramic images. The image layering application can also generate a plurality of layers from an input image.

The image layering application can preserve the transparency of each of the layers, as it was determined in creation, and renders the layer without adding additional opacity or filling in digitally what is needed to make the image opaque in printing. For example, a setting of 50% opacity means that only enough information will be transferred to render it at that opacity.

The image layering application can provide a depth calculation tool to determine the depth between the layers. In some embodiments, the image layering application allows for resizing of objects in an input image to preserve perspective as new layers are added.

The image layering application can also provide editing functions. The user may make batch edits, such as resizing multiple images, or applying edits to a group of images or multiple sizes of one image. Effects resulting from editing may be strewn across layers. For example, the effects may be broken up and rendered on multiple layers determined by the depth calculations of the image layering application. Effects placed on objects in an input image may be cast on all of the relevant layers in the scheme of the image based on the calculated depth. The effects can be applied globally, or locally, thereby, e.g., affecting only one layer or a highlighted region, or globally.

The image layering application may provide an exclusion feature such that the editing effects can be highlighted and deleted from specific layers if they are not intended to influence the layers. For example, the exclusion feature can restore a layer to its state prior to the effects.

The image layering application may also provide a history feature with label and settings for editing effects such that the user can delete specific effects when editing on a trial and error basis or exclude layers from global effects. For example, history and undo functions may be performed for individual layers as well as the entire image with a selective keep or discard function to remove one of the steps without altering the edits performed after the removed step was taken.

In some embodiments, in which the image layering application runs on a device, such as device 1100, the device can, while taking images, replicate various lens and camera attachments, such as macro, panoramic, fisheye, telephoto, infrared, or any other suitable lens and other camera attachments. The device can also replicate photo printing effects and finishes, such as antique, metallic, lithograph and the like, that can be applied to images or layers of an image. The device can also replicate filters, such as color gels that cast color as a projection from a lighting source, fog, polarizer, mist, sunset, and the like.

In some embodiments, the image layering application provides multi-source lighting effects to create a 3-point shoot recreation with flexible overhead and 2-point positioning to recreate the physical set up of a professional photo shoot. The image layering application may allow the user to create shadow points with the selection of object points to indicate the height and mass of the objects in an image or a layer of an image.

The image layering application may provide color calibration settings that allow the user to print images on any printer. For example, the image layering application may transmit color codes for each image to a printer, tagging the image settings at the time of printout, so that the printer settings can be adjusted to get the exact hues intended for the image. The image layering application can indicate to the user what settings a printer should be set to for each image as well as a monitor calibration printout to adjust a monitor to see an image clearly on screen. For example, the calibration printout may include image details, such as color saturation, hues needed for each image, and brightness and contrast settings, and the like.

The image layering application may also provide web design options that allow for easy website generation and posting of images, e.g., for sale and viewing by the public (e.g., clients, etc.). In some embodiments, templates are supplied to the user with the tools necessary to create functional websites. Such templates may be updated by Internet downloads or through upgrade packages. For example, gallery templates may be provided with zoom options and visual samples of print packages for each image. Additionally, features, such as e-card, postcard, and calendar options can be provided.

The image layering application may provide light meter tools that allow the user to determine the conditions of light in a photo shoot area. For example, the light meter tools may produce a reading of light levels for flash, exposure, ambient, and cine levels, thereby replacing the need for light meters.

The image layering application may also provide a lighting map that allows the user a 3-dimensional view of a photo shooting area and object placement in scale in a mock layout. The light map can be viewed in multiple angles to see a mock view of how and under what conditions (e.g., underwater, sunrise, noon, dusk, sunset, night shoots, overcast conditions, or closed set) light would fall so that the user can plan for contingencies.

Prompts may be provided to request details when light meter is not used to determine the light conditions. For example, windows for typing in manual settings can be provided for the expected conditions of a photo shooting space. Settings may be saved by locations. In some embodiments, the image layering application provides a GPS tool that can be used to add location details to each saved location. In some embodiments, the type of light can be chosen from a series of options, such as spotlight or directional light and soft box with wattage settings for the strength of each light, which can be modified once in place on the lighting map. The image layering application can provide prompts for natural light options to input the time of day, outdoors or indoors, placement of windows, doors, and the like.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A non-transitory computer readable storage medium storing computer executable instructions that, when executed on a processor, cause the processor to perform a method for editing a plurality of layer images of an input image, the method comprising:
displaying a photo editing interface to allow a user to apply at least one edit to at least one of the plurality of layer images;
wherein displaying the photo editing interface further comprises displaying a jog wheel menu having at least one editing function to allow a user to apply at least one edit to at least one of the plurality of layer images and at least one viewing function to allow a user to select a view of at least one of the plurality of layer images; and
wherein the jog wheel menu comprises jog wheel a menu tab displaying the at least one editing function and a menu tab displaying the at least one viewing function.

2. The non-transitory computer readable storage medium according to claim 1, wherein displaying the jog wheel menu comprises displaying a jog wheel configured to allow a user to apply the at least one editing function at a degree from 0% to 100% by rotating the jog wheel.

3. The non-transitory computer readable storage medium according to claim 1, wherein the at least one editing function includes a contact sheet function.

4. The non-transitory computer readable storage medium according to claim 1, wherein the at least one viewing function includes a split screen function.

5. The non-transitory computer readable storage medium according to claim 1, wherein the at least one editing function includes a curved text function.

6. The non-transitory computer readable storage medium according to claim 1, wherein displaying a photo editing interface to allow a user to apply at least one edit to at least one of the plurality of layer images comprises allowing a user to select one or more of the plurality of layer images and save the selected one or more layer images as a new file.

7. The non-transitory computer readable storage medium according to claim 1, the method further comprising replacing the menu tabs with a submenu after a user selects a menu tab.

8. The non-transitory computer readable storage medium according to claim 1, wherein the at least one viewing function comprises a display gallery view option, and wherein the display gallery view option allows a user to view multiple layer images, and perform at least one editing function.

9. The non-transitory computer readable storage medium according to claim 1, wherein the method further comprises combining the input image with at least a second input image to create a panoramic image.

10. The non-transitory computer readable storage medium according to claim 1, wherein the method further comprises analyzing the input image for shape recognition to detect at least one object in the input image, and determining the depth and distance the at least one object extends into shadow by measuring the degree in which a color of the at least one object strays from its pure hue toward black.

11. The non-transitory computer readable storage medium according to claim 1, wherein the method further comprises analyzing the input image to determine a depth between the plurality of layer images.

12. The non-transitory computer readable storage medium according to claim 11, wherein the at least one editing function includes an add new layer function, and wherein the method further comprises resizing objects in the input image to preserve perspective when a new layer is added.

13. The non-transitory computer readable storage medium according to claim 1, wherein the at least one editing function includes an opacity setting to allow a user to select an opacity percentage for at least one of the plurality of layer images;
the method further comprising transferring the selected opacity percentage as a percentage of visual data of the at least one layer image to a printer to preserve the transparency and opacity of the at least one layer image when printed.

14. The non-transitory computer readable storage medium according to claim 1, wherein the method further comprises providing color calibration settings to a printer;
displaying a calibration printout including calibration settings for at least one of color saturation, hues, brightness, and contrast;
applying a calibration tag to the input image, including the calibration settings; and
applying a history tag to the input image, including a description of the at least one edit.

15. The non-transitory computer readable storage medium according to claim 1, wherein the method further comprises displaying a color gel selection interface having at least one of a color wheel, hue palette, and preview window to allow the user to apply the at least one edit.

16. The non-transitory computer readable storage medium according to claim 1, wherein the input image comprises an image from a frame of a video, and wherein the method further comprises
displaying a playback window for playing back the edited version of the video; and
displaying a history window for playing back the unedited version of the video simultaneously with the edited version of the video.

17. The non-transitory computer readable storage medium according to claim 1, wherein the at least one editing function includes a shadow distance effect to allow a user to insert a new shadow into the input image, the shadow distance effect comprising:
a distance setting to allow a user to select a depth at which the shadow extends within the input image;
a bend setting to allow a user to select a line of intersection about which the shadow bends, and a degree at which the shadow bends about the line of intersection; and
wherein the shadow distance effect is configured to render the new shadow across one or more of the plurality of layer images.

18. The non-transitory computer readable storage medium according to claim 1, wherein the method further comprises displaying a layer interface to allow a user to select one or more of the plurality of layer images.

19. The non-transitory computer readable storage medium according to claim 18, wherein displaying the layer interface comprises displaying a side view of all layers of the input image, to allow the user to select at least one layer image and to perform at least one of moving, merging, removing or grouping the at least one layer image.

20. The non-transitory computer readable storage medium according to claim 1, wherein the method further comprises displaying a history interface to allow a user to select and undo an editing function non-sequentially without altering edits performed before or after the selected editing function.

21. The non-transitory computer readable storage medium according to claim 1, wherein the method further comprises displaying a lighting map interface to allow a user to place lighting effects on an image to determine the conditions of light surrounding an object in at least one of the plurality of layer images.

22. A non-transitory computer readable storage medium storing computer executable instructions that, when executed on a processor, cause the processor to perform a method for editing a plurality of layer images of an input image, the method comprising:

displaying a photo editing interface to allow a user to apply at least one edit to at least one of the plurality of layer images;

wherein displaying the photo editing interface further comprises displaying a jog wheel menu having at least one editing function to allow a user to apply at least one edit to a selection of one or more of the plurality of layer images; and rendering the least one edit across the selected one or more layer images.

* * * * *